United States Patent
Guo et al.

(10) Patent No.: US 11,349,674 B2
(45) Date of Patent: May 31, 2022

(54) DIGITAL CERTIFICATE MANAGEMENT METHOD AND APPARATUS, COMPUTER DEVICE, AND STORAGE MEDIUM

(71) Applicant: Tencent Technology (Shenzhen) Company Limited, Shenzhen (CN)

(72) Inventors: Rui Guo, Shenzhen (CN); Maocai Li, Shenzhen (CN); Jianjun Zhang, Shenzhen (CN); Zhen Zeng, Shenzhen (CN); Zichao Tang, Shenzhen (CN); Jiguang Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/003,812

(22) Filed: Aug. 26, 2020

(65) Prior Publication Data
US 2020/0396089 A1 Dec. 17, 2020

Related U.S. Application Data

(63) Continuation of application No. PCT/CN2019/092220, filed on Jun. 21, 2019.

(30) Foreign Application Priority Data

Jul. 24, 2018 (CN) .......................... 201810821687.3

(51) Int. Cl.
*H04L 29/06* (2006.01)
*H04L 9/32* (2006.01)
*H04L 9/06* (2006.01)

(52) U.S. Cl.
CPC .......... *H04L 9/3268* (2013.01); *H04L 9/0637* (2013.01); *H04L 9/3265* (2013.01); *H04L 2209/38* (2013.01)

(58) Field of Classification Search
CPC ... H04L 9/3268; H04L 9/0637; H04L 9/3265; H04L 2209/38; H04L 63/123;
(Continued)

(56) References Cited

U.S. PATENT DOCUMENTS 10,123,202 B1 * 11/2018 Polehn .................. H04W 12/42
10,666,424 B1 * 5/2020 Rutley .................. H04L 9/0637
(Continued)

FOREIGN PATENT DOCUMENTS

| CN | 105701372 A | 6/2016 |
| CN | 106384236 A | 2/2017 |

(Continued)

OTHER PUBLICATIONS

Tencent Technology, WO, PCT/CN2019/092220, Sep. 12, 2019, 5 pgs.
(Continued)

*Primary Examiner* — Mahfuzur Rahman
(74) *Attorney, Agent, or Firm* — Morgan, Lewis & Bockius LLP

(57) ABSTRACT

Embodiments of this application relate to a digital certificate management method performed at a computer device. The method includes: receiving a digital certificate generation request submitted by a certificate application node; transmitting identification information to consensus authentication centers for certification to obtain certification results obtained by the consensus authentication centers from performing the certification according to the identification information; determining an identification result corresponding to the certificate application node according to the certification results of the consensus authentication centers; generating, when the certification succeeds, a target digital certificate corresponding to the certificate application node submitting the digital certificate generation request; and
(Continued)

writing the target digital certificate as a transaction resource into a blockchain associated with the consensus authentication centers.

20 Claims, 9 Drawing Sheets

(58) Field of Classification Search
CPC . H04L 63/0823; H04L 63/126; H04L 9/3239; G06Q 40/04
See application file for complete search history.

(56) References Cited

U.S. PATENT DOCUMENTS

| | | | |
|---|---|---|---|
| 2018/0082291 A1 | 3/2018 | Allen et al. | |
| 2018/0097635 A1 | 4/2018 | Moses | |
| 2018/0157825 A1* | 6/2018 | Eksten | H04L 9/3239 |
| 2018/0183587 A1* | 6/2018 | Won | H04L 9/0891 |
| 2018/0253539 A1* | 9/2018 | Minter | H04W 12/069 |
| 2019/0005470 A1* | 1/2019 | Uhr | G06F 16/2379 |
| 2019/0081799 A1* | 3/2019 | Uhr | H04L 9/0861 |
| 2019/0140844 A1* | 5/2019 | Brown | H04L 9/321 |
| 2019/0140848 A1* | 5/2019 | Dontov | H04L 9/006 |
| 2019/0349347 A1* | 11/2019 | Curtis | H04W 12/069 |
| 2021/0083872 A1* | 3/2021 | Desmarais | G06Q 20/3829 |

FOREIGN PATENT DOCUMENTS

| | | |
|---|---|---|
| CN | 107360001 A | 11/2017 |
| CN | 107508680 A | 12/2017 |
| CN | 109067543 A | 12/2018 |
| JP | H 1165417 A | 3/1999 |
| JP | H 11126016 A | 5/1999 |
| JP | 2000024315 A | 1/2000 |
| JP | 2000189668 A | 7/2000 |
| JP | 2011155495 A | 8/2011 |
| JP | 2015217297 A | 12/2015 |
| JP | 6340107 | 6/2018 |
| KR | 20050110260 A | 11/2005 |
| KR | 20180037851 A | 4/2018 |
| WO | WO 2008108490 A1 | 9/2008 |
| WO | WO 2018112946 A1 | 6/2018 |

OTHER PUBLICATIONS

Tencent Technology, IPRP, PCT/CN2019/092220, Jan. 26, 2021, 6 pgs.
Tencent Technology, ISR, PCT/CN2019/092220, Sep. 12, 2019, 2 pgs.
"Strategy Simulation Game 'CRYPTON INJA' Utilizing Blockchain and Smart Contracts Will Be Released in June! Accepting Pre-Registration", May 23, 2018, 4 pgs., Retrieved from the Internet: https://www.atpress.ne.jp/new s/157008.
Yoshiki Higashikado et al., "A Study on Certificate Management in Consortium Chain", 2017 Cryptography and Information Security Symposium (SCIS2017) Proceedings, Jan. 24, 2017, 7 Pgs.

* cited by examiner

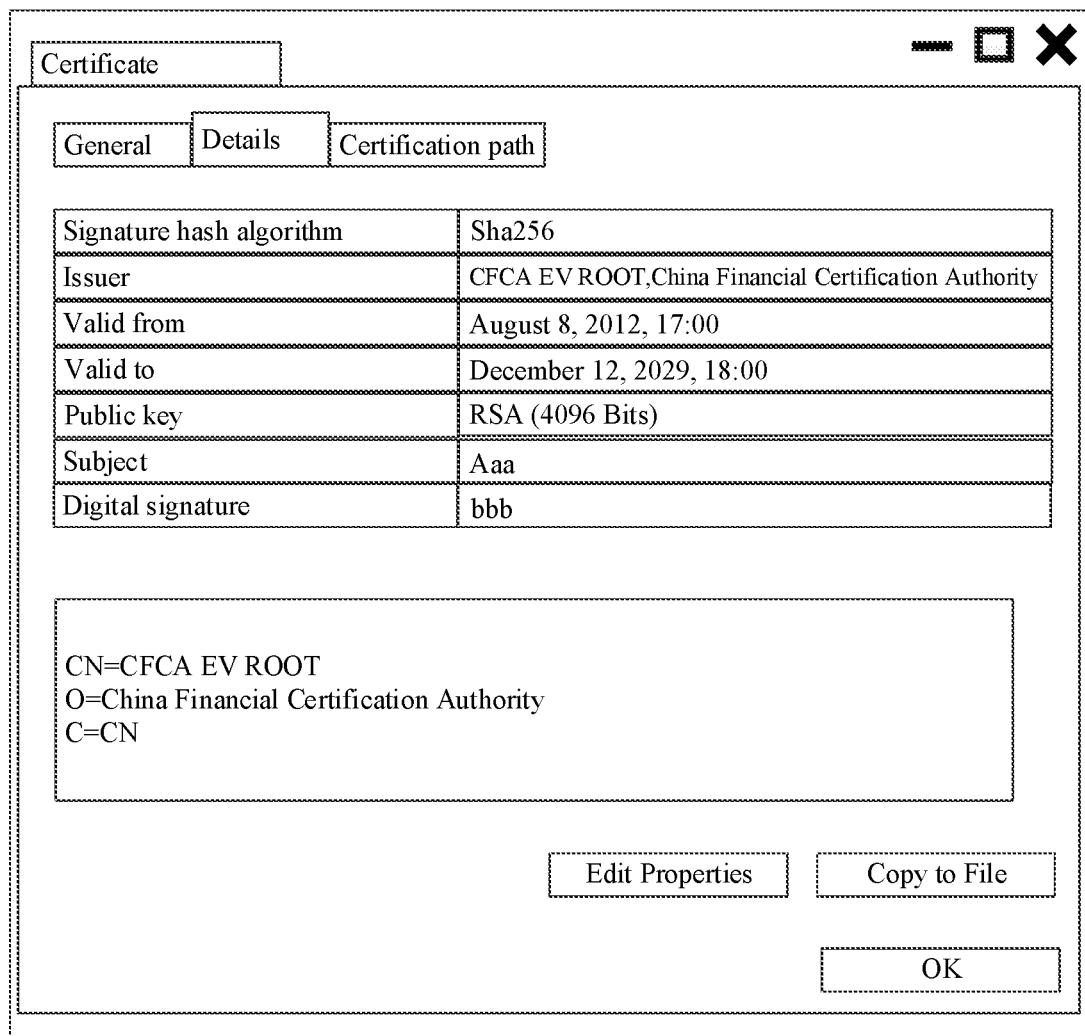

FIG. 3

Generate a first certificate transaction record, a transaction resource of the first certificate transaction record being the target digital certificate, a transfer-from account in the first certificate transaction record being a preset initial account, a recipient account in the first certificate transaction record being a certificate issuing account corresponding to a receiving node of the digital certificate generation request — S402

Write the first certificate transaction record into the blockchain associated with the consensus authentication center — S404

FIG. 4

DIGITAL CERTIFICATE MANAGEMENT METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2019/092220, entitled "DIGITAL CERTIFICATE MANAGEMENT METHOD AND APPARATUS, COMPUTER DEVICE, AND STORAGE MEDIUM" filed on Jun. 21, 2019, which claims priority to Chinese Patent Application No. 201810821687.3, entitled "DIGITAL CERTIFICATE MANAGEMENT METHOD AND APPARATUS, COMPUTER DEVICE, AND STORAGE MEDIUM" filed on Jul. 24, 2018, all of which are incorporated by reference in their entirety.

FIELD OF THE TECHNOLOGY

This application relates to the field of computer technologies, and in particular, to a digital certificate management method and apparatus, a computer device, and a storage medium.

BACKGROUND OF THE DISCLOSURE

A digital certificate is a certificate file used for verifying the identity of a network node in a network. To verify the identity, the network node may apply for a digital certificate from a certificate authority (CA). The CA issues a digital certificate to the network node after performing identification.

Often, digital certificates are all generated and stored by the CA. If the CA is hijacked, digital certificates generated or stored by the CA are unreliable, resulting in low network security.

SUMMARY

Embodiments of this application provide a digital certificate management method and apparatus, a computer device, and a storage medium, to resolve the problem of low network security in related art. Solutions are as follows:

According to an aspect, a digital certificate management method is provided, performed by a computer device. The method includes: receiving a digital certificate generation request submitted by a certificate application node, the digital certificate generation request carrying identification information; transmitting the identification information to consensus authentication centers for certification to obtain certification results obtained by the consensus authentication centers from performing the certification according to the identification information; determining an identification result corresponding to the certificate application node according to the certification results of the consensus authentication centers; generating, when the certification succeeds, a target digital certificate corresponding to the certificate application node according to the digital certificate generation request; and writing the target digital certificate as a transaction resource into a blockchain associated with the consensus authentication centers.

According to an aspect, a computer device is provided, including: a memory and a processor, the memory storing a plurality of computer programs, and the computer programs, when executed by the processor, causing the computer device to perform steps of the digital certificate management method.

According to an aspect, a non-transitory computer-readable storage medium is provided, the computer-readable storage medium storing a plurality of computer programs, and the computer programs, when executed by a processor of a computer device, causing the computer device to perform the steps of the digital certificate management method.

Beneficial effects brought by the technical solutions provided in the embodiments of this application include at least the following.

A plurality of authentication centers verify identity information of a certificate application node, determine an identification result of the certificate application node according to certification results corresponding to consensus authentication centers, and generate a digital certificate when the certification succeeds, the digital certificate being written as a transaction resource into a blockchain associated with the consensus authentication centers. Because the identification result is based on the certification results of the plurality of authentication centers, the accuracy of verification is higher than the accuracy of verification by only one authentication center. In addition, the digital certificate is written into the blockchain instead of being stored in an authentication center. It is very difficult for other illegal nodes to modify or revoke the digital certificate in the blockchain, so that the security of the digital certificate can be ensured, thereby improving network security.

BRIEF DESCRIPTION OF THE DRAWINGS

FIG. 3 is a schematic diagram of a digital certificate according to an embodiment of this application.

FIG. 4 is a flowchart of writing a target digital certificate as a transaction resource into a blockchain corresponding to consensus authentication centers according to an embodiment of this application.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, but are not used for limiting this application.

It may be understood that the terms "first", "second" and the like used in this application may be used for describing various elements in this specification. However, the elements are not limited by the terms unless otherwise specified. The terms are merely used to distinguish a first element from another element. For example, without departing from the scope of this application, a first account may be referred to as a second account, and similarly, the second account may be referred to as the first account.

The following describes related terms related to the embodiments of this application.

A digital certificate is identity information used for identifying a communication party in network communication and may be a combination of at least one of a number, a letter, and a symbol. Generally, a digital certificate is issued by a CA. For example, the CA is China Financial Certification Authority (CFCA).

An authentication center is an authoritative and impartial computer node that undertakes work such as a certification service and issuance of a digital certificate to confirm a node identity in a network.

A blockchain is used for storing a transaction record of a transaction resource. A transaction record includes three elements: a transaction resource, a transfer-from account, and a transfer-to account. In the embodiments of this application, the transaction resource is a digital certificate. In addition, an account (a transfer-from account or a transfer-to account) may also be referred to as an address. The address may be obtained by performing one-way encryption hash algorithm on a public key. The hash algorithm is a one-way function that receives an input having an arbitrary length to generate a fingerprint digest. When an address is generated from a public key, a used algorithm is the secure hash algorithm (SHA) or the race integrity primitives evaluation message digest (RIPEMD) algorithm. For example, the used algorithm may be the SHA256 algorithm or the RIPEMD160 algorithm.

A blockchain technology (BT), also referred to as a distributed ledger technology, is an Internet database technology characterized by decentralization, openness, and transparency, so that everyone can participate in database recording. The BT is a distributed-infrastructure and computing-paradigm that uses a block-chain data structure to verify and store data, a distributed-node-consensus algorithm to generate and update data, cryptography to safeguard a process of data transmission and data access, and smart contracts formed by automated scripts to write code and process data.

Figure 1:
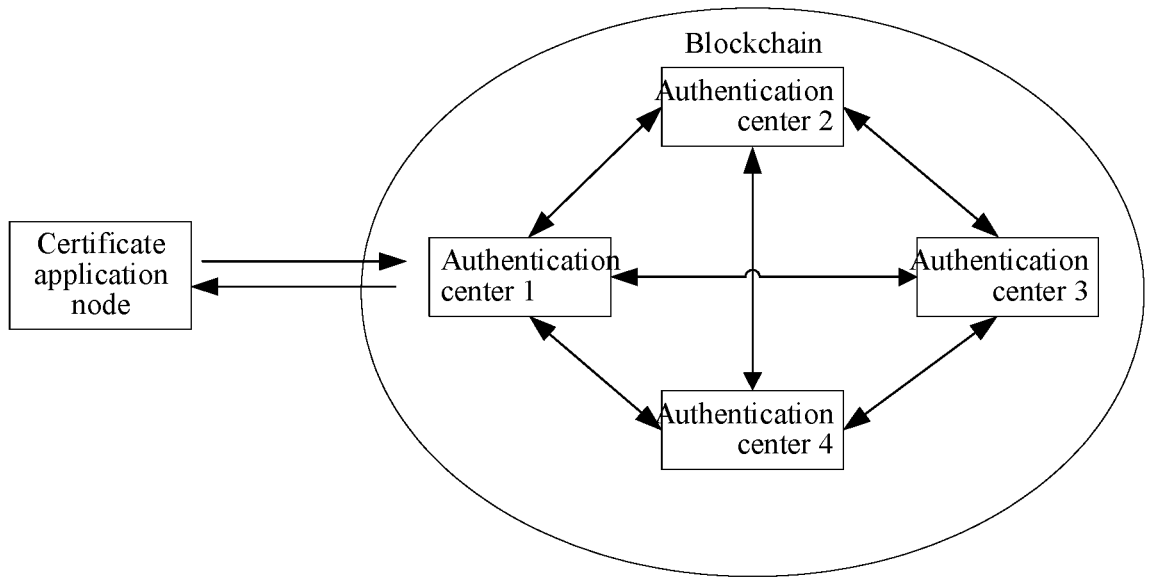
FIG. 1 is a schematic diagram of an application environment according to an embodiment of this application.

FIG. 1 is a diagram of an application environment of a digital certificate management method according to an embodiment of this application. As shown in FIG. 1, the application environment includes a certificate application node and at least two authentication centers.

The certificate application node is configured to apply for a digital certificate. When it is necessary to apply for a digital certificate, the certificate application node transmits a digital certificate application request to the authentication centers. The certificate application node may be an independent physical server or terminal, may be a server cluster formed by a plurality of physical servers, or may be a cloud server providing basic cloud computing services such as a cloud server service, a cloud database service, a cloud storage service, and a content delivery network (CDN) service.

The at least two authentication centers are used for performing consensus authentication of the certificate application node. Any one of the at least two authentication centers has a function of exchanging data with the certificate application node, for example, receiving a digital certificate application request transmitted by the certificate application node or returning a digital certificate to the certificate application node. A number of authentication centers may be set according to an actual requirement. In this embodiment of this application, description is provided only by using an example in which the at least two authentication centers include an authentication center 1, an authentication center 2, an authentication center 3, and an authentication center 4. The authentication center 1 is used for implementing the foregoing function of exchanging data with the certificate application node. Each authentication center may be an independent physical server or terminal, may be a server cluster formed by a plurality of physical servers, or may be a cloud server providing basic cloud computing services such as a cloud server service, a cloud database service, a cloud storage service, and a CDN service.

The authentication centers may be connected to each other by a network to perform the consensus authentication. The certificate application node may be connected to the authentication centers by a network. In addition, the authentication centers are nodes belonging to the same blockchain. It may be understood that the blockchain may further include other nodes, and the certificate application node may be alternatively a node in the blockchain.

Figure 2:
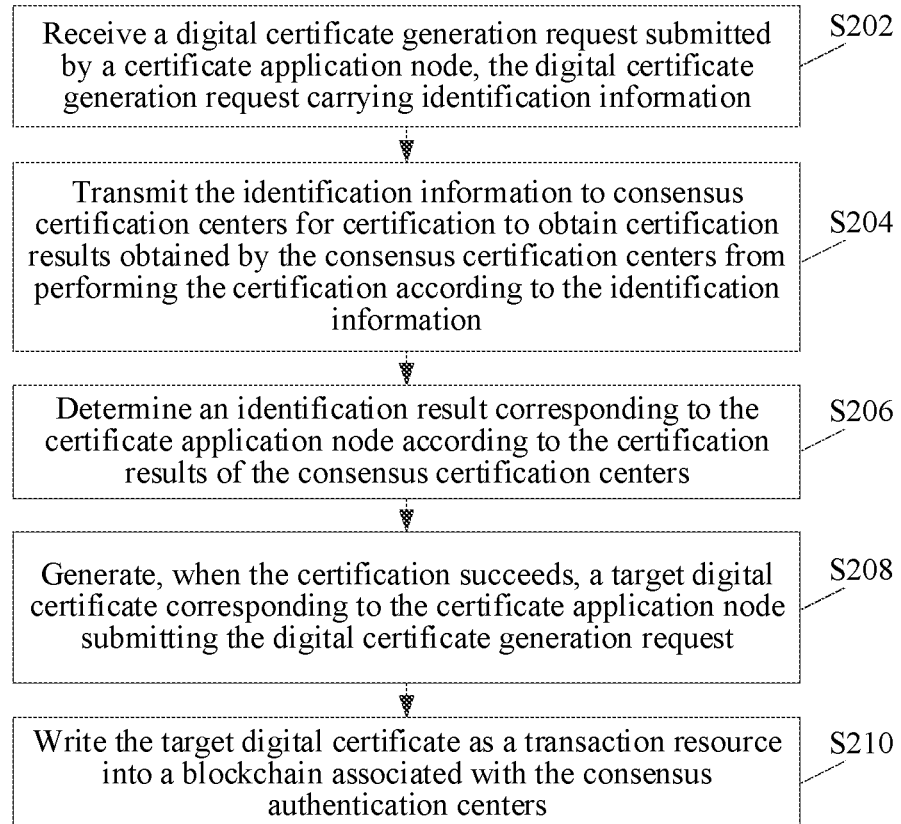
FIG. 2 is a flowchart of a digital certificate management method according to an embodiment of this application.

FIG. 2 is a flowchart of a digital certificate management method according to an embodiment of this application, and description is mainly provided by using an example in which the method is applied to a computer device (for example, the authentication center 1 in the implementation environment shown in FIG. 1) in this embodiment. The method may specifically include the following steps:

S202: Receive a digital certificate generation request submitted by a certificate application node, the digital certificate generation request carrying identification information.

The certificate application node is a computer node needing to apply for a digital certificate. The certificate application node may be a computer node possessed by an entity (an individual or an organization) in need of communication. For example, when needing to build a website, an enterprise needs to apply for a digital certificate corresponding to the website. In this case, a server of the enterprise that needs to apply for the digital certificate may transmit a digital certificate generation request to authentication centers.

The digital certificate generation request is used for generating the digital certificate. The digital certificate generation request carries identity information of the certificate application node. The identification information is used for certifying the identity of the certificate application node. Optionally, the identification information is business license information corresponding to an enterprise managing a certificate application node or identity card information corresponding to an individual user managing a certificate application node.

Optionally, the digital certificate generation request may further carry a public key of the certificate application node. A public key and a private key are a secret key pair obtained through an algorithm, the public key being a public secret key in the secret key pair, and the private key being a non-public secret key. Generally, the public key is used for encrypting a session secret key or verifying a digital signature. When it is necessary to apply for a digital certificate, the certificate application node generates a secret key pair, stores the private key of the secret key pair, and transmits the public key to the authentication center, so that the authentication center writes the public key into the digital certificate. In this way, the certificate application node may sign the transmitted information by using the private key, and a node that receives the signed information may verify the information sent by the certificate application node by using the public key of the digital certificate to determine that the received information is the information sent by the certificate application node.

S204: Transmit the identification information to consensus authentication centers for certification to obtain certification results obtained by the consensus authentication centers by performing the certification according to the identification information.

An authentication center is an authoritative and impartial computer node that undertakes work such as a certification service and issuance of a digital certificate to confirm a node identity in a network. The consensus authentication centers are authentication centers configured to perform consensus authentication. In this embodiment of this application, the authentication center 1 is also a consensus authentication center. The quantity of consensus authentication centers may be set according to an actual requirement. A consensus algorithm used in the consensus authentication may be the practical byzantine fault tolerance (PBFT). The consensus is a process in which a plurality of participating nodes reach an agreement on some data, behaviors or procedures through interaction of a plurality of nodes according to a preset rule.

In a possible implementation, the transmission of identification information may be implemented through the peer-to-peer (P2P) technology. The authentication center 1 transmits the identification information to the consensus authentication centers by using the P2P method. In another possible implementation, the authentication center 1 can broadcast the identification information in the blockchain, and a consensus authentication center that receives the identification information can continue to broadcast the identification information, so that the consensus authentication centers can receive the identification information.

After the consensus authentication centers receive the identification information, the received identification information may be compared with pre-stored identification information of the certificate application node or the identification information is transmitted to a trusted source storing identification information for comparison to determine whether the received identity information is consistent with the stored identity information. If the received identity information is consistent with the stored identity information, it is determined that the received identity information is valid, and a certification result corresponding to the consensus authentication center is that the certification succeeds. If the received identity information is not consistent with the stored identity information, the certification result is that the verification fails. The trusted source may be a node issuing the identification information, for example, a node corresponding to a public security organ that issues a personal identity card.

S206: Determine an identification result corresponding to the certificate application node according to the certification results of the consensus authentication centers.

The identification result may be that the certification succeeds or fails. In this embodiment of this application, the identification result is obtained through calculation in combination with the certification results of the consensus authentication centers. Optionally, a computer device determines the identification result according to at least one of a first quantity and a second quantity. The first quantity is a quantity of consensus authentication centers of which the certification results are that the certification succeeds. The second quantity is a quantity of consensus authentication centers of which the certification results are that the certification fails.

Specifically, the computer device determines that the certification succeeds when the first quantity and the second quantity satisfy at least one of the following conditions: the first quantity is greater than the second quantity, the first quantity reaches a first preset threshold, a ratio of the first quantity to a total quantity of the consensus authentication centers reaches a second preset threshold, and a ratio of the first quantity to a total quantity of nodes in the blockchain reaches a third preset threshold. Specific values corresponding to the first preset threshold, the second preset threshold, and the third preset threshold may be set according to an actual requirement.

For example, if the certification succeeds indicates that the ratio of the first quantity to the total quantity of the consensus authentication centers is greater than or equal to ¾ and certification results corresponding to the authentication centers 1 to 4 are that the certification succeeds, the certification succeeds, the certification succeeds, and the certification fails, the first quantity is 3, the second quantity is 1, and the ratio of the first quantity to the total quantity of the consensus authentication centers is equal to ¾. If the foregoing condition is satisfied, the identification result is that the certification succeeds.

S208: Generate, when the certification succeeds, a target digital certificate corresponding to the certificate application node submitting the digital certificate generation request.

A digital certificate is used for identifying identity information of communication parties in network communication. Optionally, the digital certificate is a file digitally signed by authentication centers. The digital certificate may carry identity information of a certificate application node. Optionally, the digital certificate may further include at least one piece of the following information: information about a certificate issuer, a public key of the certificate application node, validity period information of the digital certificate, a signature hash algorithm for a digital signature, and a digital signature. The digital signature is a message digest obtained by calculating the digital certificate according to the signature hash algorithm agreed by both parties. When any digit in the digital certificate is changed, a corresponding digital signature is also correspondingly changed, so that it can be recognized whether the digital certificate is changed.

FIG. 3 is a schematic diagram of a digital certificate according to an embodiment of this application. The digital certificate includes: information about a certificate issuer, a public key of a certificate application node, a certificate application node, that is, information about a subject, validity period information, a signature hash algorithm for a digital signature, and a digital signature.

S210: Write the target digital certificate as a transaction resource into a blockchain associated with the consensus authentication centers.

In this embodiment of this application, the computer device writes the target digital certificate as the transaction resource into blockchain associated with the consensus authentication centers, the blockchain storing a transaction record of the digital certificate.

Optionally, referring to FIG. 4, step 210 may include the following sub-steps:

S402: Generate a first certificate transaction record, a transaction resource of the first certificate transaction record being the target digital certificate, a transfer-from account in the first certificate transaction record being a preset initial account, a recipient account in the first certificate transaction record being a certificate issuing account corresponding to a receiving node of the digital certificate generation request.

The transaction record is a record of a concluded transaction corresponding to the transaction resource. The transaction record may include a transfer-from account from which the transaction resource is transferred and a recipient account that receives the transaction resource in the transaction. The transaction record includes the digital certificate or an identifier corresponding to the digital certificate.

The preset initial account is preset and is used for indicating that before a current transaction, the transaction resource is an initial resource without any transaction. A specific value of the preset initial account may be set as required. For example, the value may be a character string of 0s, and a quantity of characters in the character string may be set as required. In this embodiment of this application, because the target digital certificate is a target digital certificate that is stored for the first time, the transfer-from account may be a preset initial account, indicating that the transaction resource is an initial transaction resource.

The receiving node, that is, the authentication center 1, of the digital certificate generation request performs the steps in this embodiment of this application. The certificate issuing account corresponding to the receiving node of the digital certificate generation request may be any account possessed by the authentication center 1, and the type of the account is a certificate issuing account type. When the type of the recipient account is the certificate issuing account type, it indicates that the digital certificate is in an issuing state and is a valid digital certificate.

In this embodiment of this application, a generated first certificate transaction record is equivalent to an unspent transaction output (UTXO) transaction. When the first certificate transaction record is generated, a corresponding first transaction identifier is generated and is used for identifying the first certificate transaction record. The UTXO transaction includes a transaction input and a transaction output. Each transaction has a transaction input, that is, the source of a transaction resource, and a transaction output, that is, the destination of the transaction resource. In this embodiment of this application, an account corresponding to a transaction input is referred to as a transfer-from account, and an account corresponding to a transaction output is referred to as a recipient account.

Optionally, when generating the first certificate transaction record, a computer device may also generate a first transaction identifier corresponding to the first certificate transaction record, and the computer device may return the first transaction identifier to the certificate application node for the certificate application node to verify the target digital certificate.

S404: Write the first certificate transaction record into the blockchain associated with the consensus authentication center.

After generating the first certificate transaction record, the computer device writes the first certificate transaction record into blocks of blockchain associated with the consensus authentication centers, so that the first certificate transaction record is stored in the blocks.

Optionally, when writing the first certificate transaction record into the blocks, the computer device broadcasts the first certificate transaction record, so that nodes in the blockchain also store the first certificate transaction record in the blocks. In addition, before the first certificate transaction record is broadcast, the first certificate transaction record may be signed by using the private key, and the signed first certificate transaction record is broadcast.

In summary, in the technical solutions provided in this embodiment of this application, a plurality of authentication centers verify identity information of a certificate application node, determine an identification result of the certificate application node according to certification results corresponding to consensus authentication centers, and generate a digital certificate when the certification succeeds, the digital certificate being written as a transaction resource into a blockchain associated with the consensus authentication centers. Because the identification result is based on the certification results of the plurality of authentication centers, the accuracy of verification is higher than the accuracy of verification by only one authentication center. In addition, the digital certificate is written into the blockchain instead of being stored in an authentication center. It is very difficult for other illegal nodes to modify or revoke the digital certificate in the blockchain, so that the security of the digital certificate can be ensured, thereby improving network security.

Figure 5:
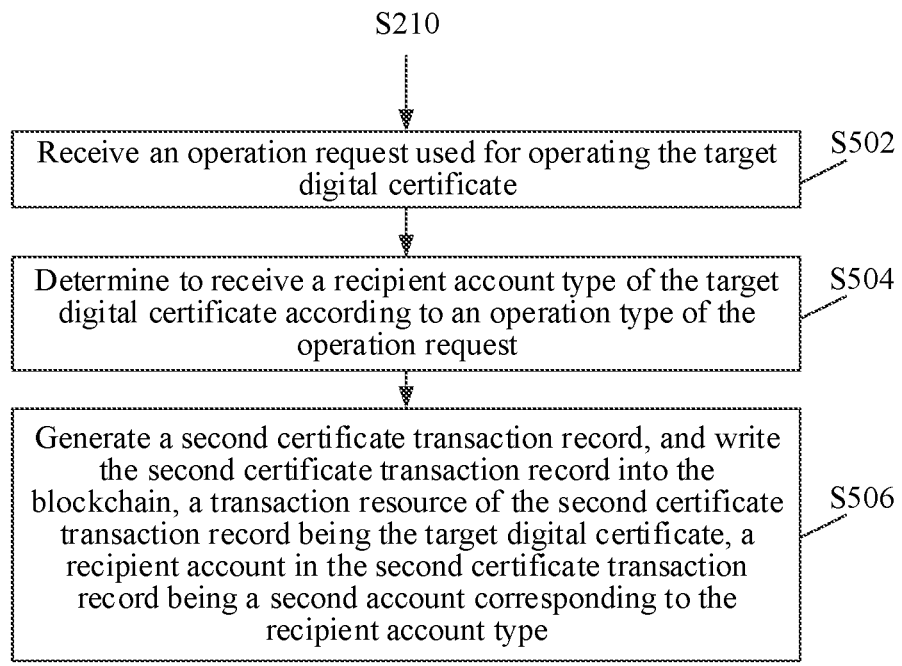
FIG. 5 is a flowchart of a digital certificate management method according to an embodiment of this application.

After the target digital certificate is written into the blockchain, other users or organizations may further operate the target digital certificate. In an optional embodiment provided based on the embodiment shown in FIG. 2, as shown in FIG. 5, the digital certificate management method further includes the following steps:

S502: Receive an operation request used for operating the target digital certificate.

In this embodiment of this application, the operation performed on the target digital certificate may be a revocation operation or an update operation. The operation request is used for requesting to operate the target digital certificate, and correspondingly, the operation request may include a digital certificate update request or a digital certificate revocation request.

Optionally, the operation request is triggered by the certificate application node or other nodes. For example, if the target digital certificate needs to be updated, the certificate application node may transmit a digital certificate update request. If the target digital certificate needs to be revoked, the certificate application node may transmit a digital certificate revocation request. In another example, if an authentication center discovers a fraudulent behavior of a certificate application node in obtaining a target digital certificate, a worker of the authentication center may initiate a revocation operation in the authentication center, and the authentication center triggers a digital certificate revocation request according to the revocation operation to request to revoke the digital certificate.

S504: Determine to receive a recipient account type of the target digital certificate according to an operation type of the operation request.

The recipient account type is the type of a recipient account generated in a transaction record according to an operation performed on the digital certificate. The recipient account type may be a certificate recovery account type or may be an account issuing account type. The certificate recovery account type indicates that the digital certificate is in a revoked state, that is, the digital certificate is revoked and is an invalid digital certificate. The certificate issuing account type indicates that the digital certificate is issued, that is, the digital certificate is in an issued state and is a valid digital certificate.

In this embodiment of this application, recipient account types corresponding to different operation types are different. In an embodiment, when the operation type of the operation request is an update operation type, it is determined that a target type is a certificate issuing account type. In an embodiment, when the operation type of the operation request is a revocation operation type, it is determined that the target type is a certificate recovery account type.

S506: Generate a second certificate transaction record, and write the second certificate transaction record into the blockchain, a transaction resource of the second certificate transaction record being the target digital certificate, a recipient account in the second certificate transaction record being a second account corresponding to the recipient account type.

The computer device presets a correspondence between an account type and an account. For example, an account corresponding to a certificate issuing account type is 00001, and an account corresponding to a certificate recovery account type is 00002. After recipient account type is obtained, the computer device determines, according to the foregoing correspondence, that an account of the recipient account type is a recipient account in the second certificate transaction record.

In addition, a transfer-from account in the second certificate transaction record may be a recipient account in a previous transaction record of the second certificate transaction record. For example, if the previous transaction record of the second certificate transaction record is a first certificate transaction record, the transfer-from account in the second certificate transaction record is the first account. Alternatively, an input of the transaction may be identified by using a transaction identifier corresponding to the previous transaction record of the second certificate transaction record. That is, the transfer-from account may be represented by the transaction identifier corresponding to the previous transaction record.

In the blockchain, the operation of writing the digital certificate into the blockchain for the first time is referred to as an insert operation. A transaction record is formed by using the insert operation as a transaction, and is written into the blockchain. Generally, because a stored transaction record is tamperproof, when the digital certificate is subsequently updated or revoked, the operation performed on the digital certificate may be used as a transaction, and a corresponding transaction record is formed according to the operation type and stored in the blockchain. In this way, to query the state of the digital certificate, it may be determined, according to an account type corresponding to a latest transaction record, whether the digital certificate is updated or revoked.

Optionally, when generating the first certificate transaction record, a computer device may also generate a first transaction identifier corresponding to the first certificate transaction record, and the computer device may return the first transaction identifier to the certificate application node for the certificate application node to verify the target digital certificate.

In summary, in the technical solutions provided in this embodiment of this application, a transaction record may be generated by operating the digital certificate at a node, and is written in the blockchain. The recipient account type uniquely corresponds to the operation type in the transaction record, and subsequently the digital certificate may be verified according to the recipient account type.

After the digital certificate is generated, an individual user may verify the digital certificate. In an optional embodiment provided based on the embodiment shown in FIG. 2, in an embodiment, the digital certificate management method may further include the following steps:

S602: Receive a verification request used for verifying the target digital certificate.

Specifically, the verification request is used for requesting to verify the target digital certificate. The verification request may be transmitted by an interaction node interacting with the certificate application node. For example, when the interaction node needs to log in to a website corresponding to the certificate application node, the target digital certificate may be obtained from the certificate application node and the verification request is transmitted to an authentication center.

In an embodiment, the verification request carries a first transaction identifier corresponding to the first certificate transaction record. When the first certificate transaction record is generated, the authentication center generates the first transaction identifier corresponding to the first certificate transaction record, and transmits the first transaction identifier to the certificate application node. If a node subsequently needs to verify the target digital certificate, the node may obtain the first transaction identifier from the certificate application node.

In another embodiment, the verification request carries a second transaction identifier corresponding to the second certificate transaction record. When the second certificate transaction record is generated, the authentication center generates the second transaction identifier corresponding to the second certificate transaction record, and transmits the second transaction identifier to the certificate application node. If a node subsequently needs to verify the target digital certificate, the node may obtain the second transaction identifier from the certificate application node.

S604: Obtain a latest transaction record corresponding to the target digital certificate from the blockchain.

The latest transaction record is the latest transaction record in transaction records corresponding to the target digital certificate. When the verification request carries the first transaction identifier, the computer device may obtain a transaction chain corresponding to the target digital certificate according to the first transaction identifier, and then use a transaction record at the end of the transaction chain as the latest transaction record.

In the blockchain, the transaction records corresponding to the target digital certificate are sequentially connected to form a transaction chain. The transaction records in the transaction chain are sequentially arranged in time order. That is, if the transaction time corresponding to a transaction record is earlier, the position of the transaction record in the transaction chain is closer to the front. If the transaction time corresponding to a transaction record is later, the position of the transaction record in the transaction chain is closer to the end. The transaction record at the end of the transaction chain is the transaction record with the latest transaction time.

In another possible implementation, the verification request may alternatively carry the second transaction identifier, the transaction chain corresponding to the target digital certificate may be obtained according to the second transaction identifier, and the transaction record at the end of the transaction chain is then used as the latest transaction record.

Figure 7:
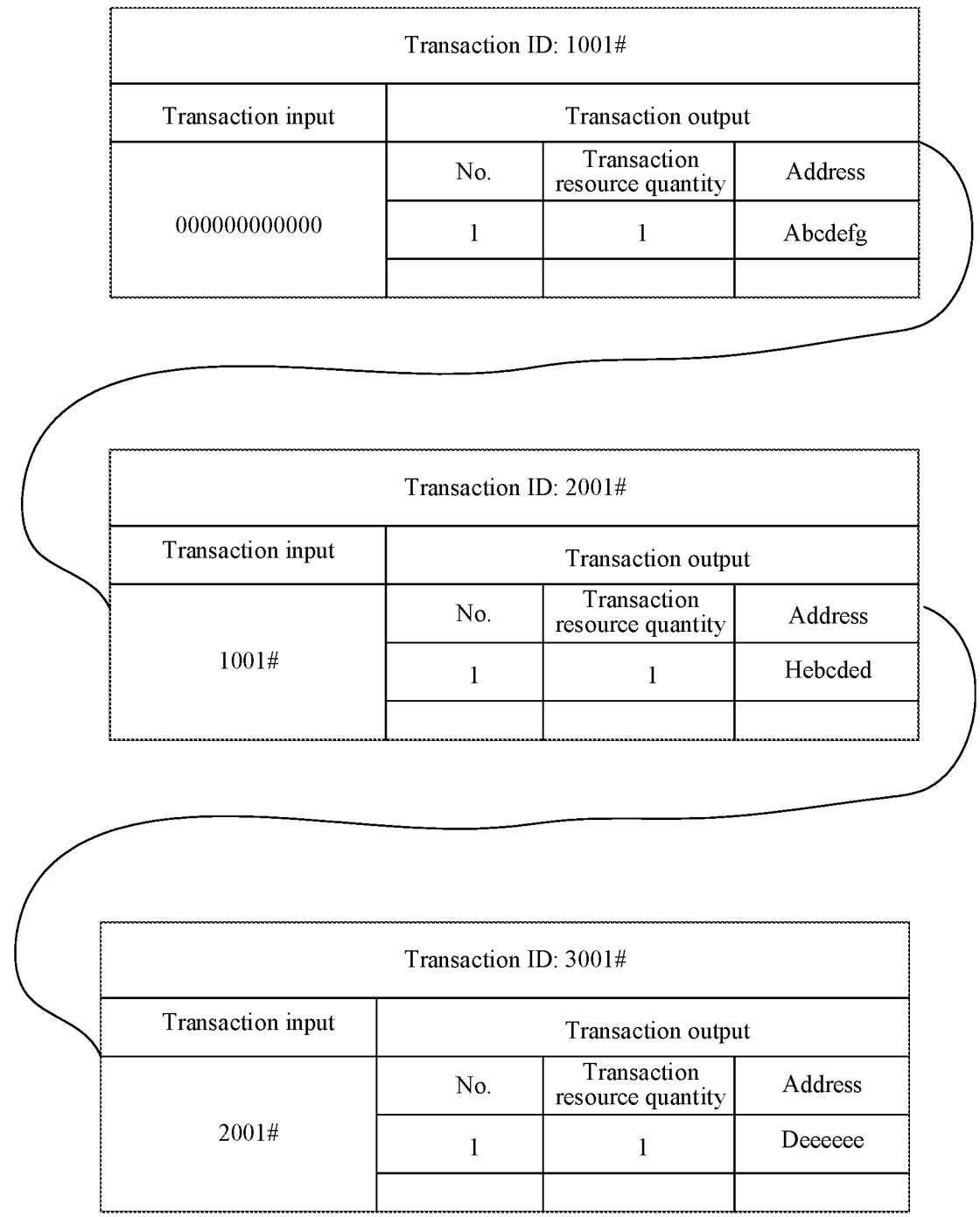
FIG. 7 is a schematic diagram of a transaction chain according to an embodiment of this application.

FIG. 7 is a schematic diagram of a transaction chain according to an embodiment of this application. In FIG. 7, a transaction record having a transaction identifier 1001# is a record corresponding to the operation of writing the digital certificate into the blockchain, 1001# is a parent transaction of 2001#, and 2001# is a parent transaction of 3001#. The transaction record may include the digital certificate or an identifier corresponding to the digital certificate.

S606: Determine a verification result corresponding to the target digital certificate according to a recipient account type in the latest transaction record.

In this embodiment of this application, after obtaining the latest transaction record, the computer device determines, according to the recipient account type in the latest transaction record, whether the verification result corresponding to the target digital certificate is that the verification succeeds or fails. Optionally, the computer device may determine an operation state of the target digital certificate according to the recipient account type in the latest transaction record, and then determine, according to the operation state, whether the verification result corresponding to the target digital certificate is that the verification succeeds or fails.

The operation state of the digital certificate in the blockchain may be one of an inserted state, an updated state, and a revoked state. A digital certificate corresponding to the inserted state is inserted into the blockchain as a newly generated initial digital certificate. A digital certificate corresponding to the updated state is a digital certificate obtained by updating an initial digital certificate. That is, the digital certificate is updated. A digital certificate corresponding to the revoked state is a revoked digital certificate.

When a recipient account type corresponding to the latest transaction record is the certificate recovery account type, it is determined that the operation state of the digital certificate in the blockchain is the revoked state. That is, the target digital certificate is revoked. In this case, a verification result corresponding to the target digital certificate is that the verification fails. When the recipient account type corresponding to the latest transaction record is the certificate issuing account type, it is determined that the operation state of the digital certificate in the blockchain is the inserted state or the updated state. In this case, the digital certificate is valid, and it is determined that the verification result corresponding to the target digital certificate is that the verification succeeds.

Optionally, other nodes may also verify the identity information of a receiving node of the digital certificate generation request. When it is verified that the receiving node of the digital certificate generation request is unreliable, a digital certificate issued by the receiving node is definitely invalid. When it is verified that the receiving node of the digital certificate generation request is reliable, it further needs to be verified whether the digital certificate is valid. The following describes a verification process in which the identity information of the receiving node of the digital certificate generation request is verified.

Figure 6:
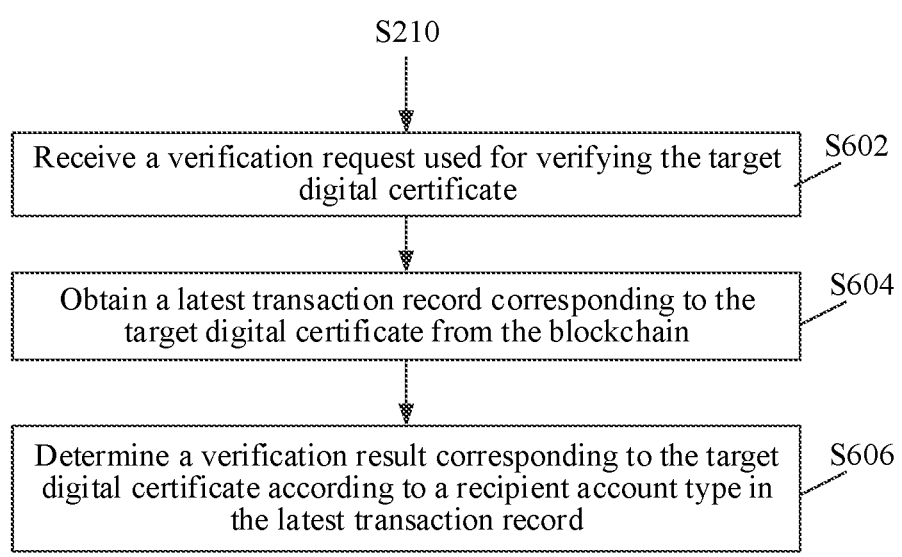
FIG. 6 is a flowchart of a digital certificate management method according to an embodiment of this application.
Figure 8:
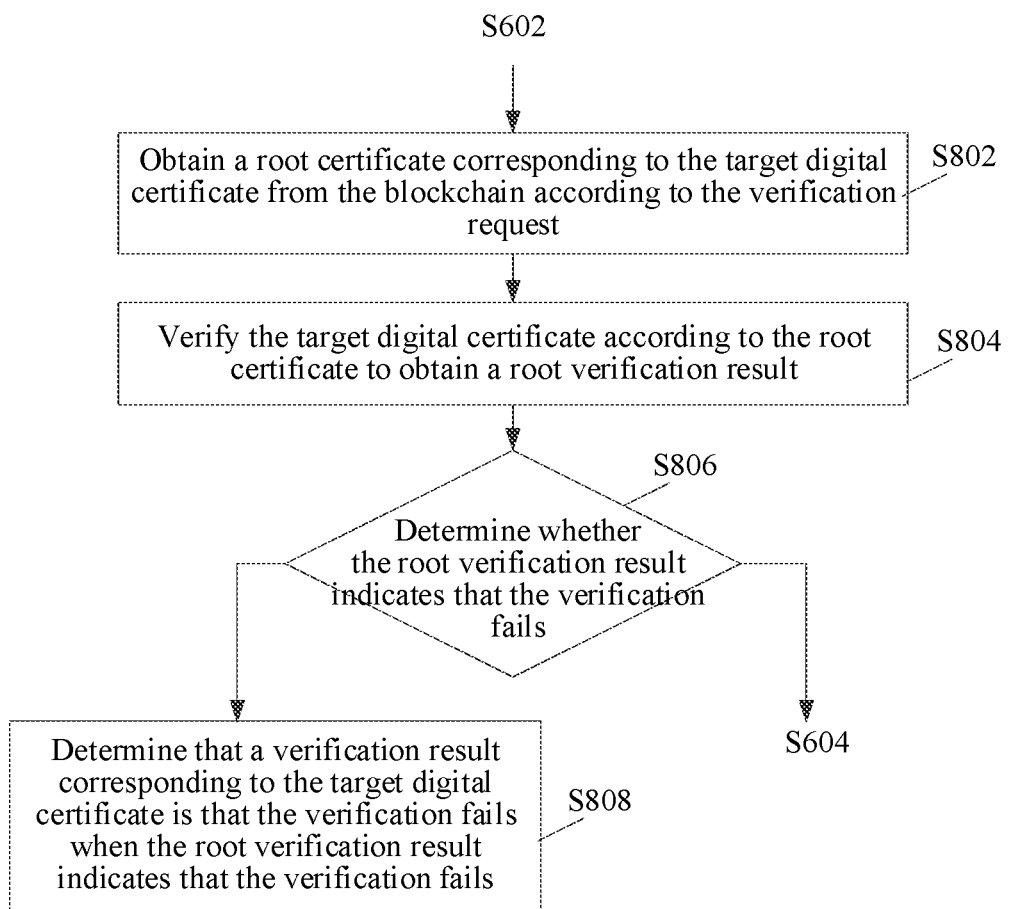
FIG. 8 is a flowchart of a digital certificate management method according to an embodiment of this application.

In an optional embodiment provided based on the embodiment shown in FIG. 6, as shown in FIG. 8, in an embodiment, the digital certificate management method may further include the following steps:

S802: Obtain a root certificate corresponding to the target digital certificate from the blockchain according to the verification request.

The root certificate is a certificate issued by an authentication center to the authentication center itself and is a starting point of a trust chain. The root certificate is stored in a genesis block of the blockchain. The genesis block is the first block of the blockchain, making the root certificate less prone to tampering.

The root certificate is used for verifying a digital certificate issued by an authentication center. A digital signature in the digital certificate may be verified by using a public key in the root certificate to determine the legality and validity of the digital certificate, that is, to determine whether the target digital certificate is issued by a CA. The root certificate may be alternatively stored in the blockchain.

S804: Verify the target digital certificate according to the root certificate to obtain a root verification result.

The root verification result may be that the verification succeeds or fails. Optionally, a computer device can obtain the public key in the root certificate to verify the digital signature of the target digital certificate. If it is determined that the verification of the digital signature succeeds, the verification succeeds. If it is determined that the verification of the digital signature fails, the verification fails.

S806: Determine whether the root verification result indicates that the verification fails.

If the root verification result indicates that the verification fails, step S808 is performed. If the root verification result is that the verification succeeds, step S604 is performed.

S808: Determine that a verification result corresponding to the target digital certificate is that the verification fails when the root verification result indicates that the verification fails.

Specifically, if the root verification result is that the verification fails, it is determined that the verification result corresponding to the target digital certificate is that the verification fails and it is no longer necessary to continue to verify the target digital certificate. If the root verification result is that the verification succeeds, the step of obtaining the latest transaction record corresponding to the target digital certificate from the blockchain is performed, and the target digital certificate continues to be verified.

Figure 9:
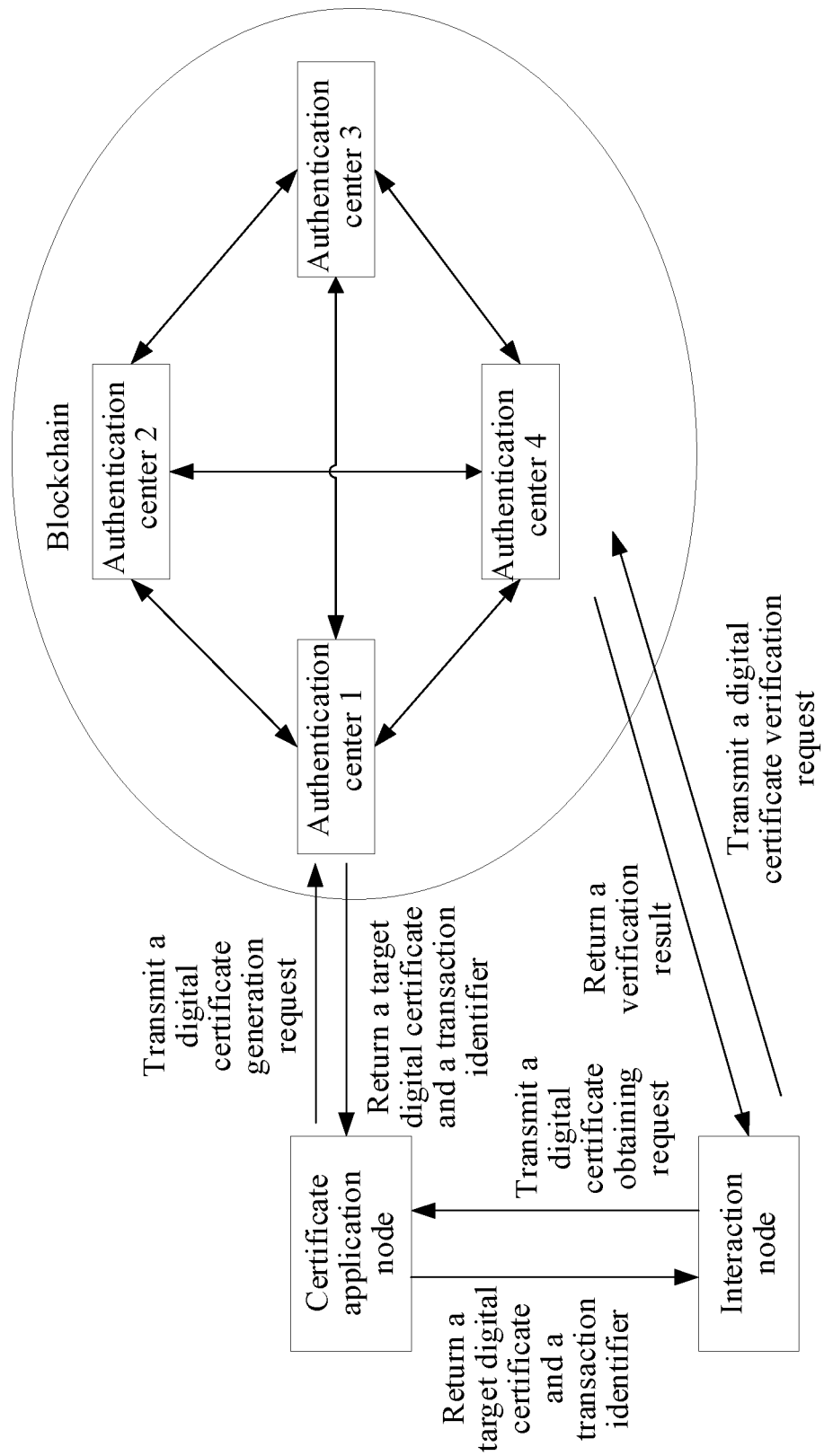
FIG. 9 is a schematic diagram of a digital certificate management method according to an embodiment of this application.

In a specific example, FIG. 9 is a flowchart of a digital certificate management method according to an embodiment of this application. The method may include the following steps:

1: A certificate application node transmits a digital certificate generation request to an authentication center 1, the digital certificate generation request carrying identification information.

2: The authentication center 1 transmits the identification information to an authentication center 2, an authentication center 3, and an authentication center 4 for consensus authentication.

3: When an identification result obtained according to a result of the consensus authentication is that the certification succeeds, the authentication center 1 generates a target digital certificate and a corresponding first transaction record, stores the first transaction record in the latest block in a blockchain, and returns the target digital certificate and a first transaction identifier to the certificate application node.

4: When interacting with the certificate application node, an interaction node transmits a digital certificate obtaining request to the certificate application node.

5: The certificate application node returns the target digital certificate and the first transaction identifier to the interaction node.

6: The interaction node transmits a verification request to the authentication center 4, the verification request carrying the first transaction identifier and the target digital certificate.

7: The authentication center 4 obtains a root certificate from a genesis block, and verifies the target digital certificate according to the root certificate to obtain a root verification result.

8: When the root verification result is that the verification succeeds, the authentication center 4 obtains a recipient account type of a latest transaction record in a transaction chain corresponding to the target digital certificate according to the first transaction identifier, and determines a verification result according to the recipient account type of the latest transaction record. For example, if the recipient account type is a recovery account type, it indicates that the target digital certificate is revoked, and the verification result is that the verification fails.

It may be understood that another node in the blockchain may receive a verification request and perform verification provided that the interaction node determines that the node is trustworthy. Alternatively, the interaction node may be a node in the blockchain. In this way, the interaction node obtains a root certificate and a transaction record from locally stored blockchain data for verification.

Apparatus embodiments of this application are described below, and may be used for performing the method embodiments of this application. For details that are not disclosed in the apparatus embodiments of this application, refer to the method embodiments of this application.

Figure 10:
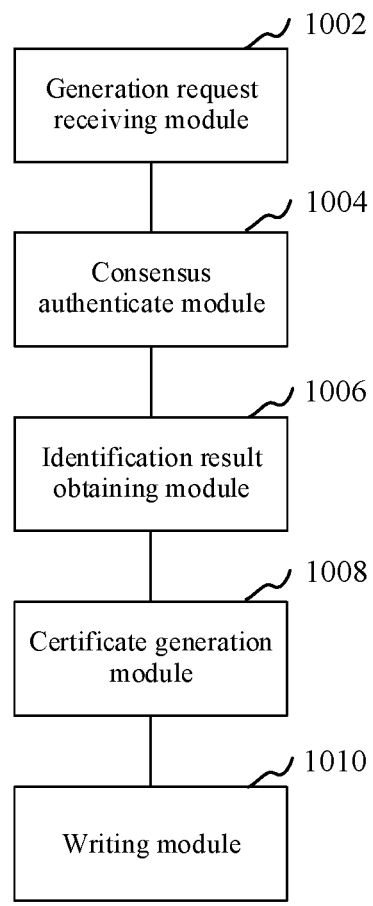
FIG. 10 is a structural block diagram of a digital certificate management apparatus according to an embodiment of this application.

FIG. 10 is a block diagram of a digital certificate management apparatus according to an embodiment of this application. The apparatus has functions of implementing the foregoing method examples. The functions may be implemented by using hardware or may be implemented by hardware executing corresponding software. The apparatus may include a generation request receiving module 1002, a consensus authenticate module 1004, an identification result obtaining module 1006, a certificate generation module 1008, and a writing module 1010.

The generation request receiving module 1002 is configured to receive a digital certificate generation request submitted by a certificate application node, the digital certificate generation request carrying identification information.

The consensus authenticate module 1004 is configured to transmit the identification information to consensus authentication centers for authentication to obtain authentication results obtained by the consensus authentication centers by performing the authentication according to the identification information.

The identification result obtaining module 1006 is configured to determine an identification result corresponding to the certificate application node according to the certification results of the consensus authentication centers.

The certificate generation module 1008 is configured to generate, when the certification succeeds, a target digital certificate corresponding to the certificate application node according to the digital certificate generation request.

The writing module 1010 is configured to write the target digital certificate as a transaction resource into a blockchain associated with the consensus authentication centers when the certification succeeds.

In summary, in the technical solutions provided in this embodiment of this application, a plurality of authentication centers verify identity information of a certificate application node, determine an identification result of the certificate application node according to certification results corresponding to consensus authentication centers, and generate a digital certificate when the certification succeeds, the digital certificate being written as a transaction resource into a blockchain associated with the consensus authentication centers. Because the identification result is based on the certification results of the plurality of authentication centers, the accuracy of verification is higher than the accuracy of verification by only one authentication center. In addition, the digital certificate is written into the blockchain instead of being stored in an authentication center. It is very difficult for other illegal nodes to modify or revoke the digital certificate in the blockchain, so that the security of the digital certificate can be ensured, thereby improving network security.

Figure 11:
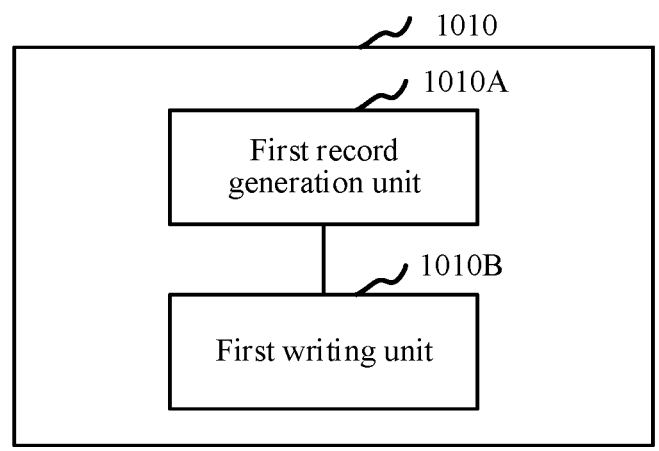
FIG. 11 is a structural block diagram of a writing module according to an embodiment of this application.

In an optional embodiment provided based on the embodiment shown in FIG. 10, as shown in FIG. 11, the writing module 1010 includes:

a first record generation unit 1010A, configured to generate a first certificate transaction record, a transaction resource of the first certificate transaction record being the target digital certificate, a transfer-from account in the first certificate transaction record being a preset initial account, and a recipient account in the first certificate transaction record being a certificate issuing account corresponding to a receiving node of the digital certificate generation request; and a first writing unit 1010B, configured to write the first certificate transaction record into the blockchain associated with the consensus authentication centers.

Figure 12:
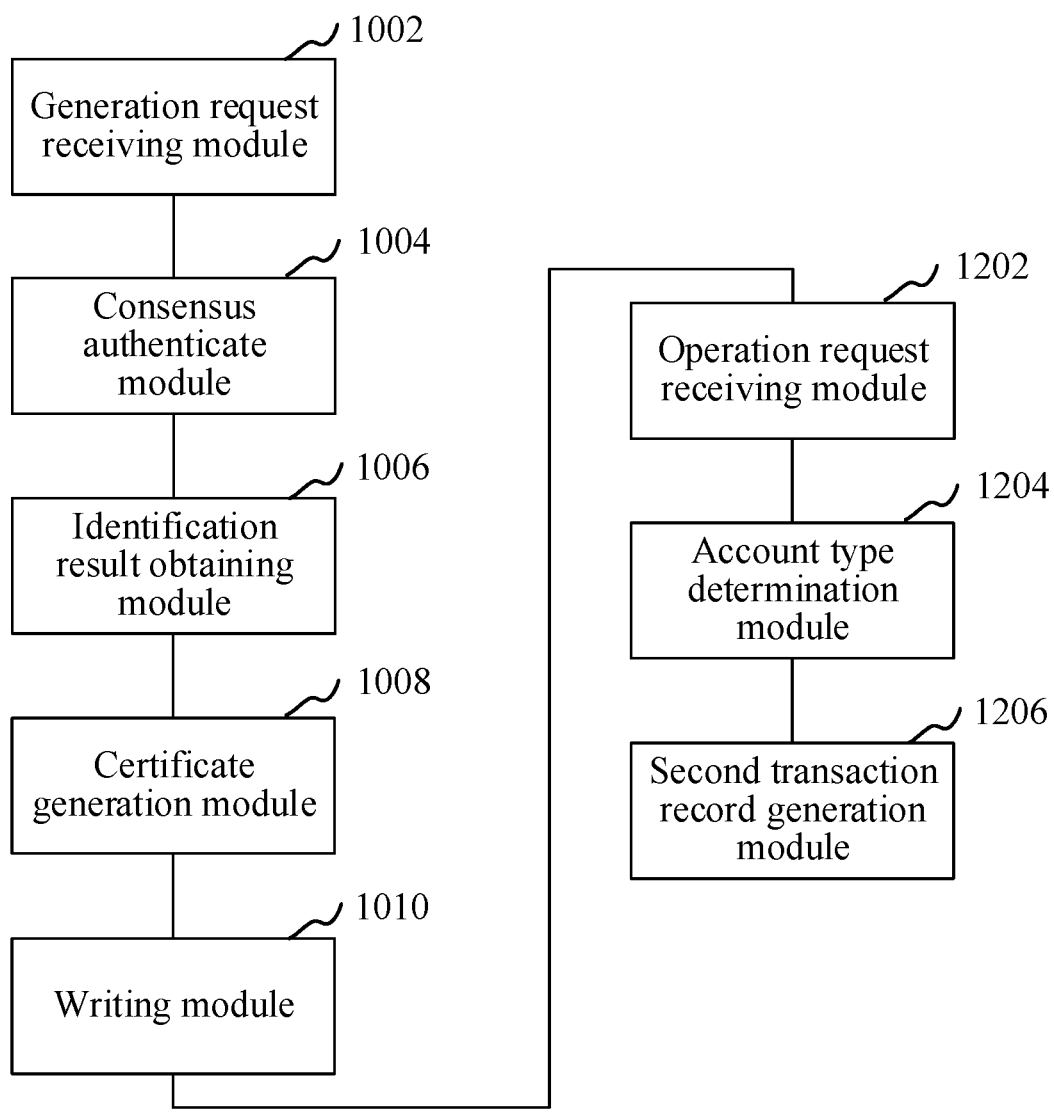
FIG. 12 is a structural block diagram of a digital certificate management apparatus according to an embodiment of this application.

In an optional embodiment provided based on the embodiment shown in FIG. 10, as shown in FIG. 12, the digital certificate management apparatus further includes:

an operation request receiving module 1202, configured to receive an operation request used for operating the target digital certificate;

an account type determination module 1204, configured to determine to receive a recipient account type of the target digital certificate according to an operation type of the operation request; and a second transaction record generation module 1206, configured to: generate a second certificate transaction record, and write the second certificate transaction record into the blockchain, a transaction resource of the second certificate transaction record being the target digital certificate, a recipient account in the second certificate transaction record being a second account corresponding to the recipient account type.

Optionally, the account type determination module 1204 is configured to determine that the recipient account type is a certificate issuing account type when the operation type of the operation request is an update operation type.

Optionally, the account type determination module 1204 is configured to determine that the recipient account type is a certificate recovery account type in a case that the operation type of the operation request is a revocation operation type.

In an optional embodiment provided based on the embodiment shown in FIG. 10, the digital certificate management apparatus further includes:

a verification request receiving module, configured to receive a verification request used for verifying the target digital certificate;

a transaction record obtaining module, configured to obtain a latest transaction record corresponding to the target digital certificate from the blockchain; and a verification result determination module, configured to determine a verification result corresponding to the target digital certificate according to a recipient account type in the latest transaction record.

Optionally, the verification result determination module is configured to determine that the target digital certificate is revoked and the verification result corresponding to the target digital certificate is that the verification fails when the recipient account type corresponding to the latest transaction record is a certificate recovery account type.

Optionally, the verification result determination module is configured to determine that the verification result corresponding to the target digital certificate is that the verification succeeds when the recipient account type corresponding to the latest transaction record is a certificate issuing account type.

Optionally, the verification request carries a first transaction identifier corresponding to the first certificate transaction record, and the first transaction identifier is transmitted by a receiving node of the digital certificate generation request to the certificate application node and is then transmitted by the certificate application node to a verification request transmission node.

Optionally, the transaction record obtaining module is configured to: obtain a transaction chain corresponding to the target digital certificate according to the first transaction identifier, and use a transaction record at the end of the transaction chain as the latest transaction record, the transaction chain being sequentially arranged according to transaction time.

Optionally, the apparatus further includes:

a certificate obtaining module, configured to obtain a root certificate corresponding to the target digital certificate from the blockchain according to the verification request, the root certificate being used for verifying identity information of the receiving node of the digital certificate generation request; and a verification module, configured to verify the target digital certificate according to the root certificate to obtain a root verification result.

The transaction record obtaining module is further configured to perform the steps of obtaining a latest transaction record corresponding to the target digital certificate from the blockchain in a case that the root verification result is that the verification succeeds.

Figure 13:
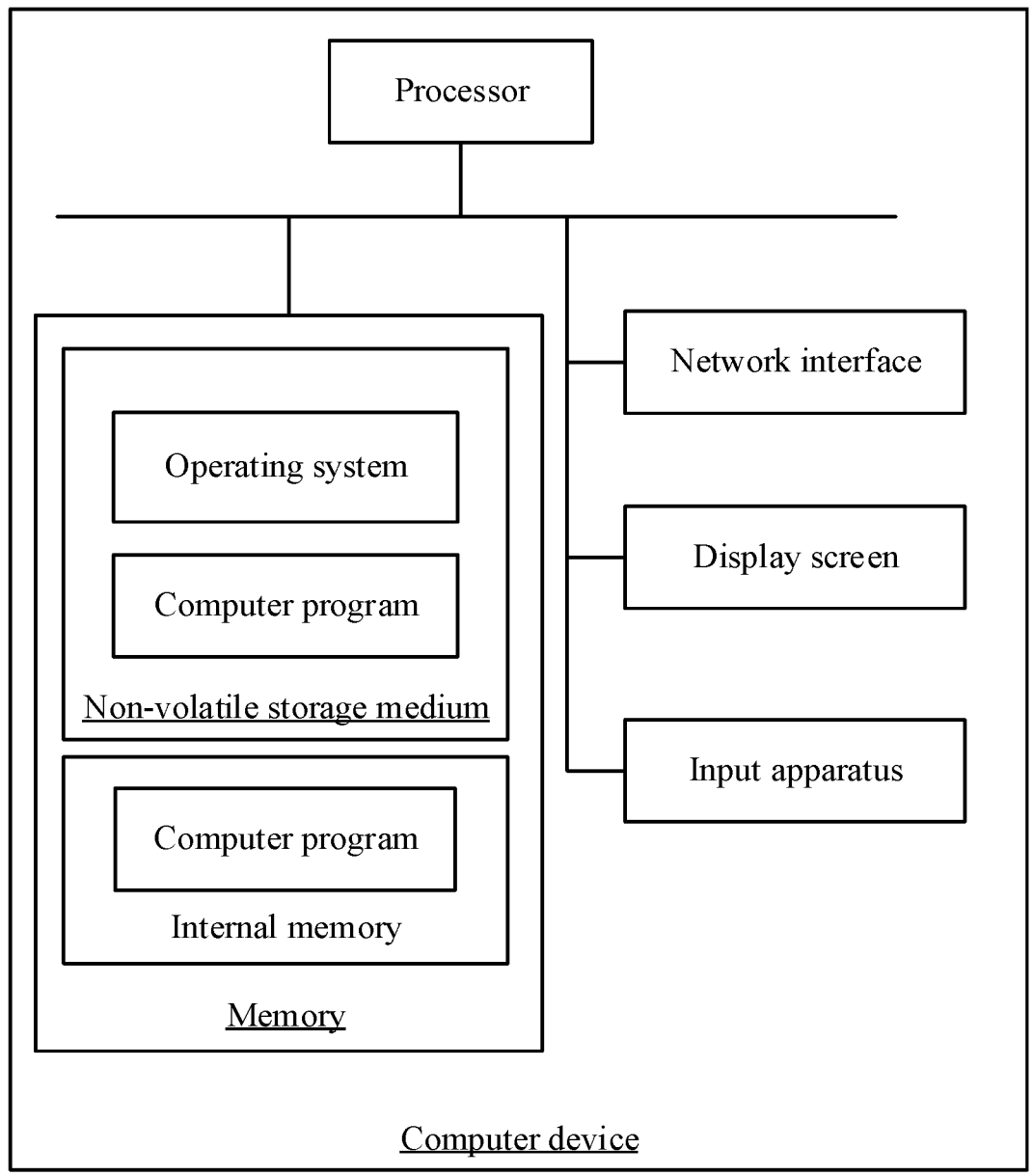
FIG. 13 is an internal structural block diagram of a computer device according to an embodiment of this application.

FIG. 13 is an internal structural diagram of a computer device according to an embodiment of this application. The computer device may be specifically the authentication center in FIG. 1. As shown in FIG. 13, the computer device includes a processor, a memory, a network interface, and an input apparatus that are connected by a system bus. The memory includes a non-transitory storage medium and an internal memory. The non-transitory storage medium of the computer device stores an operating system and may further store a computer program, the computer program, when executed by the processor, causing the processor to implement the digital certificate management method. The internal memory may also store a computer program, the computer program, when executed by the processor, causing the processor to perform the digital certificate management method. The input apparatus of the computer device may be a touch layer covering a display screen or may be a button, a trackball or a touch panel disposed on a housing of the computer device or may be an external keyboard, touch panel, mouse or the like.

A person skilled in the art may understand that the structure shown in FIG. 13 is merely a block diagram of a part of the structure related to the solution of this application, and does not constitute a limitation on a computer device to which the solution of this application is applied. In particular, the computer device may include more or fewer components than those shown in the figures, or combine some components, or have different component arrangements.

In an exemplary embodiment, the memory stores a computer program, the computer program being loaded and executed by the processor to implement the digital certificate management method in the foregoing method embodiments.

In an exemplary embodiment, a non-transitory computer-readable storage medium is further provided, the non-transitory computer-readable storage medium storing a computer program, the computer program being loaded and executed by a processor of a computer device to implement the digital certificate management method in the foregoing method embodiments.

Any reference to a memory, a storage, a database or another medium used in the embodiments provided in this application may include a non-volatile and/or volatile memory.

The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration instead of a limitation, the RANI is available in various forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link DRAM (SLDRAM), a Rambus direct RAM (RDRAM), a direct Rambus dynamic RAM (DRDRAM), and a Rambus dynamic RAM (RDRAM) or the like.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only show several implementations of this application and are described in detail, but they are not to be construed as a limit to the patent scope of this application. A person of ordinary skill in the art may make various changes and improvements without departing from the ideas of this application, which shall all fall within the protection scope of this application. Therefore, the protection scope of the patent of this application shall be subject to the appended claims.

What is claimed is:

1. A digital certificate management method, performed by a computer device having a processor and a memory storing a plurality of computer programs, the method comprising:
receiving a digital certificate generation request submitted by a certificate application node, the digital certificate generation request carrying identification information;
transmitting the identification information to consensus authentication centers for certification to obtain certification results obtained by the consensus authentication centers from performing the certification according to the identification information;
determining an identification result corresponding to the certificate application node according to the certification results of the consensus authentication centers;
generating, when the certification succeeds, a target digital certificate corresponding to the certificate application node submitting the digital certificate generation request; and writing the target digital certificate as a transaction resource into a first certificate transaction record of a blockchain associated with the consensus authentication centers, wherein the target digital certificate is configured to be delivered to a certificate issuing account corresponding to a receiving node of the digital certificate generation request and a recipient account type of the first certificate transaction record corresponding to the target digital certificate in the blockchain is determined according to an operation request for operating the target digital certificate.

2. The method according to claim 1, wherein the writing the target digital certificate as a transaction resource into a first certificate transaction record of a blockchain associated with the consensus authentication centers comprises:

generating the first certificate transaction record, a transaction resource of the first certificate transaction record being the target digital certificate, a transfer-from account in the first certificate transaction record being a preset initial account; and writing the first certificate transaction record into the blockchain associated with the consensus authentication centers.

3. The method according to claim 1, wherein after the writing the target digital certificate as a transaction resource into a first certificate transaction record of a blockchain associated with the consensus authentication centers, the method further comprises:

in response to the operation request, generating a second certificate transaction record, and writing the second certificate transaction record into the blockchain, a transaction resource of the second certificate transaction record being the target digital certificate, a recipient account in the second certificate transaction record being a second account corresponding to the recipient account type.

4. The method according to claim 1, wherein the recipient account type of the first certificate transaction record corresponding to the target digital certificate in the blockchain is a certificate issuing account type when an operation type of the operation request is an update operation type.

5. The method according to claim 1, wherein the recipient account type of the first certificate transaction record corresponding to the target digital certificate in the blockchain is a certificate recovery account type when an operation type of the operation request is a revocation operation type.

6. The method according to claim 1, wherein after the writing the target digital certificate as a transaction resource into a first certificate transaction record of a blockchain associated with the consensus authentication centers, the method further comprises:

receiving a verification request used for verifying the target digital certificate;

obtaining a latest transaction record corresponding to the target digital certificate from the blockchain; and determining a verification result corresponding to the target digital certificate according to a recipient account type in the latest transaction record.

7. The method according to claim 6, wherein the determining a verification result corresponding to the target digital certificate according to a recipient account type in the latest transaction record comprises:

determining that the target digital certificate is revoked and the verification result corresponding to the target digital certificate indicates that the verification fails in a case that the recipient account type in the latest transaction record is a certificate recovery account type.

8. The method according to claim 6, wherein the determining a verification result corresponding to the target digital certificate according to a recipient account type in the latest transaction record comprises:

determining that the verification result corresponding to the target digital certificate indicates that the verification succeeds in a case that the recipient account type in the latest transaction record is a certificate issuing account type.

9. The method according to claim 6, wherein the verification request carries a first transaction identifier corresponding to the first certificate transaction record, and the first transaction identifier is transmitted by a receiving node of the digital certificate generation request to the certificate application node and is then transmitted by the certificate application node to a verification request transmission node.

10. The method according to claim 9, wherein the obtaining a latest transaction record corresponding to the target digital certificate from the blockchain comprises:

obtaining a transaction chain corresponding to the target digital certificate according to the first transaction identifier; and using a transaction record at the end of the transaction chain as the latest transaction record, the transaction chain being sequentially arranged according to a transaction time.

11. The method according to claim 6, wherein before the obtaining a latest transaction record corresponding to the target digital certificate from the blockchain, the method further comprises:

obtaining a root certificate corresponding to the target digital certificate from the blockchain according to the verification request, the root certificate being used for verifying identity information of the receiving node of the digital certificate generation request;

verifying the target digital certificate according to the root certificate to obtain a root verification result; and performing the operations of obtaining a latest transaction record corresponding to the target digital certificate from the blockchain in a case that the root verification result is that the verification succeeds.

12. A computer device, comprising a memory and a processor, the memory storing a plurality of computer programs, and the computer programs, when executed by the processor, causing the computer device to perform a plurality of operations including:

receiving a digital certificate generation request submitted by a certificate application node, the digital certificate generation request carrying identification information;

transmitting the identification information to consensus authentication centers for certification to obtain certification results obtained by the consensus authentication centers from performing the certification according to the identification information;

determining an identification result corresponding to the certificate application node according to the certification results of the consensus authentication centers;

generating, when the certification succeeds, a target digital certificate corresponding to the certificate application node submitting the digital certificate generation request; and writing the target digital certificate as a transaction resource into a first certificate transaction record of a blockchain associated with the consensus authentication centers, wherein the target digital certificate is configured to be delivered to a certificate issuing account corresponding to a receiving node of the digital certificate generation request and a recipient account type of the first certificate transaction record corresponding to the target digital certificate in the blockchain is determined according to an operation request for operating the target digital certificate.

13. The computer device according to claim 12, wherein the writing the target digital certificate as a transaction resource into a first certificate transaction record of a blockchain associated with the consensus authentication centers comprises:
generating the first certificate transaction record, a transaction resource of the first certificate transaction record being the target digital certificate, a transfer-from account in the first certificate transaction record being a preset initial account; and
writing the first certificate transaction record into the blockchain associated with the consensus authentication centers.

14. The computer device according to claim 12, wherein the plurality of operations further comprise:
after writing the target digital certificate as the transaction resource into the first certificate transaction record of the blockchain associated with the consensus authentication centers:
in response to the operation request, generating a second certificate transaction record, and writing the second certificate transaction record into the blockchain, a transaction resource of the second certificate transaction record being the target digital certificate, a recipient account in the second certificate transaction record being a second account corresponding to the recipient account type.

15. The computer device according to claim 12, wherein the recipient account type of the first certificate transaction record corresponding to the target digital certificate in the blockchain is a certificate issuing account type when an operation type of the operation request is an update operation type.

16. The computer device according to claim 12, wherein the recipient account type of the first certificate transaction record corresponding to the target digital certificate in the blockchain is a certificate recovery account type when an operation type of the operation request is a revocation operation type,
determining that the recipient account type is a certificate recovery account type in a case that the operation type of the operation request is a revocation operation type.

17. The computer device according to claim 12, wherein the plurality of operations further comprise:
after writing the target digital certificate as the transaction resource into the first certificate transaction record of the blockchain associated with the consensus authentication centers:
receiving a verification request used for verifying the target digital certificate;
obtaining a latest transaction record corresponding to the target digital certificate from the blockchain; and
determining a verification result corresponding to the target digital certificate according to a recipient account type in the latest transaction record.

18. The computer device according to claim 17, wherein the determining a verification result corresponding to the target digital certificate according to a recipient account type in the latest transaction record comprises:
determining that the target digital certificate is revoked and the verification result corresponding to the target digital certificate indicates that the verification fails in a case that the recipient account type in the latest transaction record is a certificate recovery account type.

19. The computer device according to claim 17, wherein the determining a verification result corresponding to the target digital certificate according to a recipient account type in the latest transaction record comprises:
determining that the verification result corresponding to the target digital certificate indicates that the verification succeeds in a case that the recipient account type in the latest transaction record is a certificate issuing account type.

20. A non-transitory computer-readable storage medium, storing a plurality of computer programs, the computer programs, when executed by a processor of a computer device, causing the computer device to perform a plurality of operations including:
receiving a digital certificate generation request submitted by a certificate application node, the digital certificate generation request carrying identification information;
transmitting the identification information to consensus authentication centers for certification to obtain certification results obtained by the consensus authentication centers from performing the certification according to the identification information;
determining an identification result corresponding to the certificate application node according to the certification results of the consensus authentication centers;
generating, when the certification succeeds, a target digital certificate corresponding to the certificate application node submitting the digital certificate generation request; and
writing the target digital certificate as a transaction resource into a first certificate transaction record of a blockchain associated with the consensus authentication centers,
wherein the target digital certificate is configured to be delivered to a certificate issuing account corresponding to a receiving node of the digital certificate generation request and a recipient account type of the first certificate transaction record corresponding to the target digital certificate in the blockchain is determined according to an operation request for operating the target digital certificate.

* * * * *